(12) United States Patent
Kazama et al.

(10) Patent No.: US 9,380,140 B2
(45) Date of Patent: Jun. 28, 2016

(54) ELECTRONIC APPARATUS

(71) Applicant: KYOCERA CORPORATION, Kyoto (JP)

(72) Inventors: Shun Kazama, Yokohama (JP); Akio Kihara, Yokohama (JP); Kiyokazu Sato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/405,926

(22) PCT Filed: Jul. 26, 2013

(86) PCT No.: PCT/JP2013/004555
§ 371 (c)(1),
(2) Date: Dec. 5, 2014

(87) PCT Pub. No.: WO2014/020877
PCT Pub. Date: Feb. 6, 2014

(65) Prior Publication Data
US 2015/0156295 A1    Jun. 4, 2015

(30) Foreign Application Priority Data

| Jul. 30, 2012 | (JP) | 2012-168834 |
| Jul. 30, 2012 | (JP) | 2012-168857 |
| Jul. 30, 2012 | (JP) | 2012-168929 |

(51) Int. Cl.
*H05K 11/02* (2006.01)
*H04M 1/03* (2006.01)
(Continued)

(52) U.S. Cl.
CPC ............. *H04M 1/035* (2013.01); *H04B 13/005* (2013.01); *H04M 1/0266* (2013.01); *H04M 1/03* (2013.01); *H04R 7/045* (2013.01); *H04R 17/00* (2013.01); *H04M 1/19* (2013.01); *H04R 2440/01* (2013.01)

(58) Field of Classification Search
CPC ..... H04R 1/2807; H04R 2499/03; H04R 7/20
USPC ........ 455/550.1, 566, 350; 181/199, 148, 171
See application file for complete search history.

(56) References Cited

U.S. PATENT DOCUMENTS

| 7,050,600 | B2 * | 5/2006 | Saiki | H04M 1/03 381/186 |
| 8,807,267 | B2 * | 8/2014 | Iwata | H04R 1/28 181/148 |

(Continued)

FOREIGN PATENT DOCUMENTS

| JP | 2004-187031 A | 7/2004 |
| JP | 2005-348193 A | 12/2005 |

(Continued)

OTHER PUBLICATIONS

Kobayashi et al., JP2006094072.pdf, Apr. 6, 2006, pp. 1-7, machine translated document from Espacenet.*

(Continued)

*Primary Examiner* — Sonny Trinh
(74) *Attorney, Agent, or Firm* — Studebaker & Brackett PC

(57) ABSTRACT

An electronic apparatus that may reduce sound leakage from a housing and the like vibrated by a vibrator and echo caused by the sound leakage is provided. An electronic apparatus includes a panel, a panel retainer for supporting the panel, and an element for vibrating the panel and thereby generating a vibration sound to be delivered via a human body, wherein a region of the panel near a disposing position of the element is thinner in a normal direction of the panel than a remaining region of the panel.

17 Claims, 7 Drawing Sheets

(51) Int. Cl.
*H04R 17/00* (2006.01)
*H04M 1/02* (2006.01)
*H04R 7/04* (2006.01)
*H04B 13/00* (2006.01)
*H04M 1/19* (2006.01)

(56) References Cited

U.S. PATENT DOCUMENTS

2013/0267278 A1* 10/2013 Nabata ................ H04M 19/047
 455/566
2015/0018046 A1* 1/2015 Nabata .................... H04M 1/03
 455/566

FOREIGN PATENT DOCUMENTS

JP 2006-094072 A 4/2006
JP 2006-333021 A 12/2006

OTHER PUBLICATIONS

International Search Report; PCT/JP2013/004555; Sep. 10, 2013.
Written Opinion of the International Searching Authority; PCT/JP2013/004555; Sep. 10, 2013; with concise explanation.

* cited by examiner

ELECTRONIC APPARATUS

CROSS REFERENCE TO RELATED APPLICATIONS

This application claims priority to and the benefit of Japanese Patent Applications No. 2012-168929, No. 2012-168857, and No. 2012-168834 that are filed on Jul. 30, 2012, the entire contents of which are incorporated herein by reference.

TECHNICAL FIELD

The present invention relates to an electronic apparatus for vibrating a panel by applying a predetermined electrical signal (sound signal) to a piezoelectric element and for delivering a vibration sound to a user by delivering the vibration of the panel to a user's body.

BACKGROUND ART

Patent Document 1 describes an electronic apparatus such as a mobile phone that delivers an air conduction sound and a bone conduction sound to a user. Patent Document 1 also describes that the air conduction sound is a sound that is delivered to the auditory nerve of the user when vibration of the air caused by vibration of an object reaches the eardrum through the ear canal and vibrates the eardrum. Patent Document 1 further describes that the bone conduction sound is a sound that is delivered to the auditory nerve of the user via a part of a user's body (for example, the cartilage of the ear) in contact with the object being vibrating.

In the phone described in Patent Document 1, a vibrator in the form of a short rectangular plate formed by a piezoelectric bimorph and a flexible material is attached to an outer surface of a housing via an elastic member. Patent Document 1 also describes that, upon application of a voltage to the piezoelectric bimorph of the vibrator, a piezoelectric material stretches in a longitudinal direction causing curving vibration of the vibrator and thus, when the user brings the vibrator into contact with the auricle, the air conduction sound and the bone conduction sound are delivered to the user.

RELATED ART DOCUMENT

Patent Document

Patent Document 1: Japanese Patent Application Laid-Open Publication No. 2005-348193

SUMMARY OF INVENTION

Technical Problem

However, the electronic apparatus described in Patent Document 1 has only a small area for vibrating, and therefore does not consider an issue of sound leakage caused when a large panel is vibrated.

An object of the present invention is to provide an electronic apparatus that may reduce the sound leakage therefrom.

Solution to Problem

An electronic apparatus according to the present invention includes:
a panel;
a panel retainer for supporting the panel; and
an element for vibrating the panel and thereby generating a vibration sound to be delivered via a human body, wherein
compared with a region of the panel near a disposing position of the element, a remaining region of the panel is thicker in a normal direction of the panel.

A thickness of the panel in the normal direction thereof may gradually increase in proportion to a distance from the region of the panel near the disposing position of the element.

A thickness of the panel in the normal direction thereof may be changed at a position in a predetermined distance from the region near the disposing position of the element.

The panel may generate the vibration sound and an air conduction sound.

Also, an electronic apparatus according to the present invention includes: a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer is thicker in a normal direction of the panel.

A thickness of the panel retainer in the normal direction of the panel may gradually increase in proportion to a distance from a region of the panel retainer for supporting a region of the panel near the disposing position of the element.

A thickness of the panel retainer in the normal direction of the panel may be changed at a position in a predetermined distance from the region of the panel retainer for supporting the region of the panel near the disposing position of the element.

The panel may generate the vibration sound and an air conduction sound.

Further, an electronic apparatus according to the present invention includes:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer hay have higher rigidity.

The rigidity of the panel retainer may correspond to flexural rigidity of the panel retainer.

A material of a region of the panel retainer for supporting a region of the panel near the disposing position of the element may have lower glass fiber content than a material of a region of the panel retainer for supporting a remaining region of the panel.

The region of the panel retainer for supporting the region of the panel near the disposing position of the element may contain a material with lower rigidity than a material of the region of the panel retainer for supporting the remaining region of the panel.

Into the region of the panel retainer for supporting the remaining region of the panel, a plate-shaped member having higher rigidity than the region of the panel retainer for supporting the region of the panel near the disposing position of the element may be inserted.

Compared with the region of the panel retainer for supporting the region of the panel near the disposing position of the element, the region of the panel retainer for supporting the remaining region of the panel may be thicker in a normal direction of the panel.

A thickness of the panel retainer in the normal direction of the panel may gradually increase in proportion to a distance from the region of the panel retainer for supporting the region of the panel near the disposing position of the element.

The thickness of the panel retainer in the normal direction of the panel may be changed at a position in a predetermined distance from the region of the panel retainer for supporting the region of the panel near the disposing position of the element.

The panel may generate the vibration sound and an air conduction sound.

The panel may be bent by the element in such a manner that a region of the panel directly above the element is raised the highest in a longitudinal direction of the element as compared with its surrounding region, and the panel may vibrate a part of a human body in contact with the panel and deliver a sound.

Effect of the Invention

According to the present invention, an electronic apparatus that may reduce sound leakage from a housing and the like vibrated by a vibrator and echo caused by the sound leakage may be provided.

DESCRIPTION OF EMBODIMENTS (First Embodiment)

Figure 1:
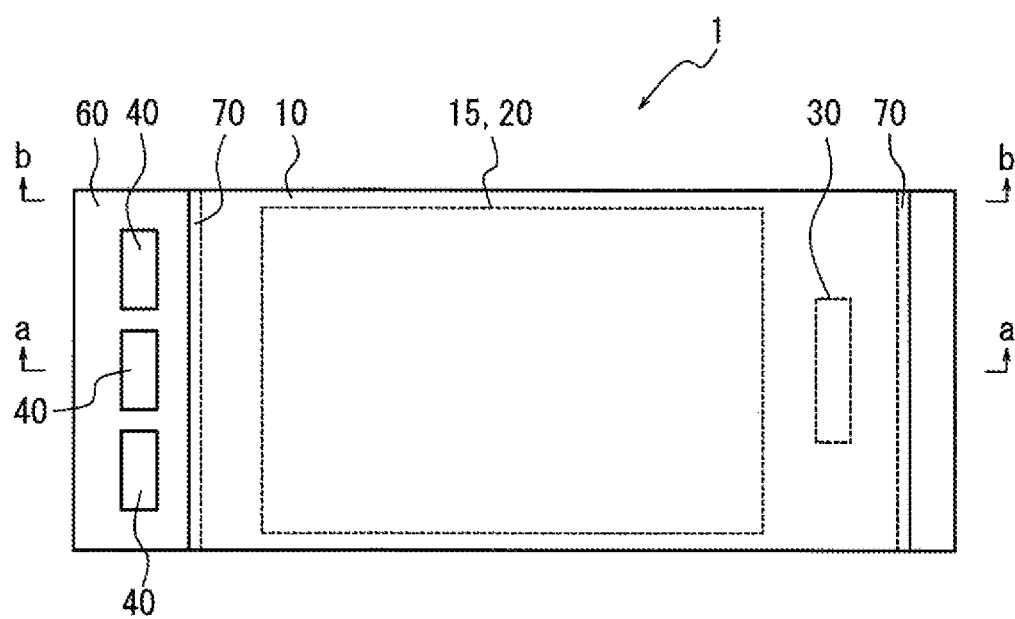
FIG. 1 is a diagram illustrating a housing structure of an electronic apparatus according to a first embodiment of the present invention.

Hereinafter, embodiments of the present invention will be described in detail with reference to the accompanying drawings. FIG. 1 is a diagram illustrating a housing structure of an electronic apparatus 1 according to a first embodiment of the present invention. Note that FIG. 1 is a diagram schematically illustrating main components of the housing structure of the electronic apparatus 1 in a planar view.

The electronic apparatus 1 is, for example, a mobile phone terminal (smart phone) and includes a panel 10, a touch sensor 15, a display 20, a piezoelectric element 30, an input unit (a key) 40, a substrate 50, a housing 60, a panel retainer 65, and a joint member 70.

As illustrated in FIG. 1, the electronic apparatus 1, when viewed in a planer view, includes the panel 10, the input unit 40, and the housing 60 in appearance. The touch sensor 15, the display 20, the piezoelectric element 30, and the joint member 70 are disposed on a rear side of the panel 10 and thus indicated by broken lines in FIG. 1.

The panel 10 is a cover panel or the like for protecting the touch sensor 15 for detecting a contact and the display 20. The panel 10 is made of, for example, glass or synthetic resin such as acryl and the like. Preferably, the panel 10 has a plate-like shape. The panel 10 may be a flat plate or a curved panel with a smoothly inclined surface.

The touch sensor 15 detects a contact to the panel 10 by a user's finger, a pen, a stylus pen and the like. A detection method of the touch sensor may be any one of an electrostatic capacitance method, a resistance film method, a surface acoustic wave method (or an ultrasound method), an infrared method, an electromagnetic induction method, a load detection method and the like. Note that, when the panel 10 has a touch sensing function, the touch sensor 15 may be omitted.

The display 20 is a display device such as a liquid crystal display, an organic EL display, an inorganic EL display or the like. The display 20 is disposed on a rear surface of the panel 10. For example, the touch sensor 15 may be attached to a rear surface of the panel 10 by using a joint member (for example, an adhesive) and, in a similar manner, the display 20 may be attached to a rear surface of the touch sensor 15. When the panel 10 has the touch sensing function, the display 20 may be attached to the rear surface of the panel 10 by using the joint member (for example, the adhesive). The display 20 may be attached to the panel 10 by using the joint member (for example, the adhesive), or spaced apart from the panel 10 and supported by the housing of the electronic apparatus 1.

The piezoelectric element 30 is an element that, upon application of an electrical signal (a voltage) thereto, stretches or curves (bends) in accordance with an electromechanical coupling coefficient of a material forming the piezoelectric element 30. The piezoelectric element 30 may be made of, for example, ceramic or crystal. The piezoelectric element 30 may be a unimorph, a bimorph, or a laminated piezoelectric element. The laminated piezoelectric element includes a laminated unimorph element including laminated unimorphs (for example, 16 to 24 layers thereof), or a laminated bimorph element including laminated bimorphs (for example, 16 to 24 layers thereof). The laminated piezoelectric element has a multilayer structure including a plurality of dielectric layers made of, for example, PZT (lead zirconate titanate) and electrode layers disposed therebetween. The unimorph stretches upon application of the electrical signal (voltage), while the bimorph curves upon application of the electrical signal (voltage). Note that the present invention may use, instead of the piezoelectric element, various known vibration excitation elements as long as they are capable of generating vibration.

The piezoelectric element 30 is disposed on the rear surface of the panel 10 (an internal surface of the electronic apparatus 1). The piezoelectric element 30 is attached to the panel 10 by using a joint member (for example, a double-sided adhesive tape). Or, the piezoelectric element 30 may be attached to the panel 10 via an intermediate member (for example, sheet metal). The piezoelectric element 30 is disposed on the rear surface of the panel 10 while being spaced apart from an internal surface of the housing 60 by a predetermined distance. The piezoelectric element 30 is preferably spaced apart from the internal surface of the housing 60 by a predetermined distance also when the piezoelectric element is stretching or curving. That is, the distance between the piezoelectric element 30 and the internal surface of the housing 60 is preferably greater than a maximum deformation amount of the piezoelectric element 30.

The input unit 40 receives an input operation from a user and is constituted by using, for example, an operation button (an operation key). Note that the input unit 40 is not limited to the keys disposed at three locations as illustrated in FIG. 1 but may be any number of keys or buttons disposed at any locations. Also, when the panel 10 is the touch panel, the panel 10 may also receive the input operation from the user by detecting the contact by the user.

As described below, the substrate 50 is disposed on a rear side of the display 20. On the substrate 50, various components including a controller may be mounted. Here, the controller is a processor for controlling the electronic element 1. The controller applies a predetermined electrical signal (a voltage corresponding to a voice of the other party or an acoustic signal of a ringtone or music including songs) to the piezoelectric element 30. Note that the acoustic signal may be based on music data stored in an internal storage or music data stored in an external server and the like to be replayed via the network.

When the electrical signal is applied to the piezoelectric element 30, the piezoelectric element 30 stretches or curves in a longitudinal direction thereof. At this time, the panel 10 having the piezoelectric element 30 attached thereto deforms following the stretch or the curve of the piezoelectric element 30 and vibrates in a curving manner. Here, a maximum voltage of the electrical signal applied to the piezoelectric element 30 by the controller mounted on the substrate 50 may be, for example, ±15 V, which is greater than a voltage ±5 V applied to what is called a panel speaker used for the purpose of delivering sound by an air conduction sound as opposed to a vibration sound. Therefore, when the user presses the panel 10 against a user's body applying force of, for example, 3 N or greater (force of 5 N to 10 N on average), the panel 10 may generate sufficient curving vibration allowing generation of the vibration sound via a part of the user's body (for example, the cartilage of the external ear). Note that a level of the voltage to apply is appropriately adjustable based on fixing strength of the panel 10 to the housing or a support member, or based on performance of the piezoelectric element 30. Upon application of the electrical signal to the piezoelectric element 30, the piezoelectric element 30 stretches or curves in the longitudinal direction thereof. At this time, the panel 10 having the piezoelectric element 30 attached thereto deforms following the stretch or the curve of the piezoelectric element 30 and vibrates. The panel 10 is curved due to the stretch or the bend of the piezoelectric element. The panel 10 is bent directly by the piezoelectric element. Note that "the panel 10 is bent directly by the piezoelectric element" is different from a phenomenon that, as employed by a conventional panel speaker, inertial force of a piezoelectric actuator composed of the piezoelectric element disposed inside a casing excites a specific region of the panel and deforms the panel. "The panel 10 is bent directly by the piezoelectric element" means that the stretch or the bend (curve) of the piezoelectric element directly bends the panel via the joint member, or via the joint member and other reinforcing members and the like. Accordingly, the panel 10 generates the air conduction sound and also, when the user brings the panel 10 into contact with a part of the user's body (for example, the cartilage of the external ear), generates the vibration sound via the part of the user's body. For example, the controller may apply the electrical signal corresponding to a sound signal of the voice of the other party to the piezoelectric element 30 such that the air conduction sound and the vibration sound corresponding to the sound signal are generated. The sound signal may be a ringtone, or music including songs.

The panel 10 vibrates in the curving manner in an attaching region having the piezoelectric elements attached thereto, as well as in a region remote from the attaching region. The panel 10, in the regions to vibrate, includes a plurality of portions that vibrate in a direction intersecting with a main surface of the panel 10, in each of which a value of amplitude of the vibration changes with time from positive to negative or vice versa. The panel 10, at a certain moment, vibrates in such a manner that regions with relatively large vibration amplitude and regions with relatively small vibration amplitude are seemingly distributed in a random or periodic manner in a wide region of the panel 10. That is, in the wide region of the panel 10, vibrations of a plurality of waves are detected. In order to prevent attenuation of the vibration of the panel 10 as described above when the user presses the panel 10 against the user's body applying the force of, for example, 5 N to 10 N, the voltage applied to the piezoelectric element 30 by the controller may be ±15 V. Thereby, the user may hear the sound by bringing the region remote from the attaching region of the panel 10, e.g. a central portion of the panel 10, into contact with the ear.

Figure 2:
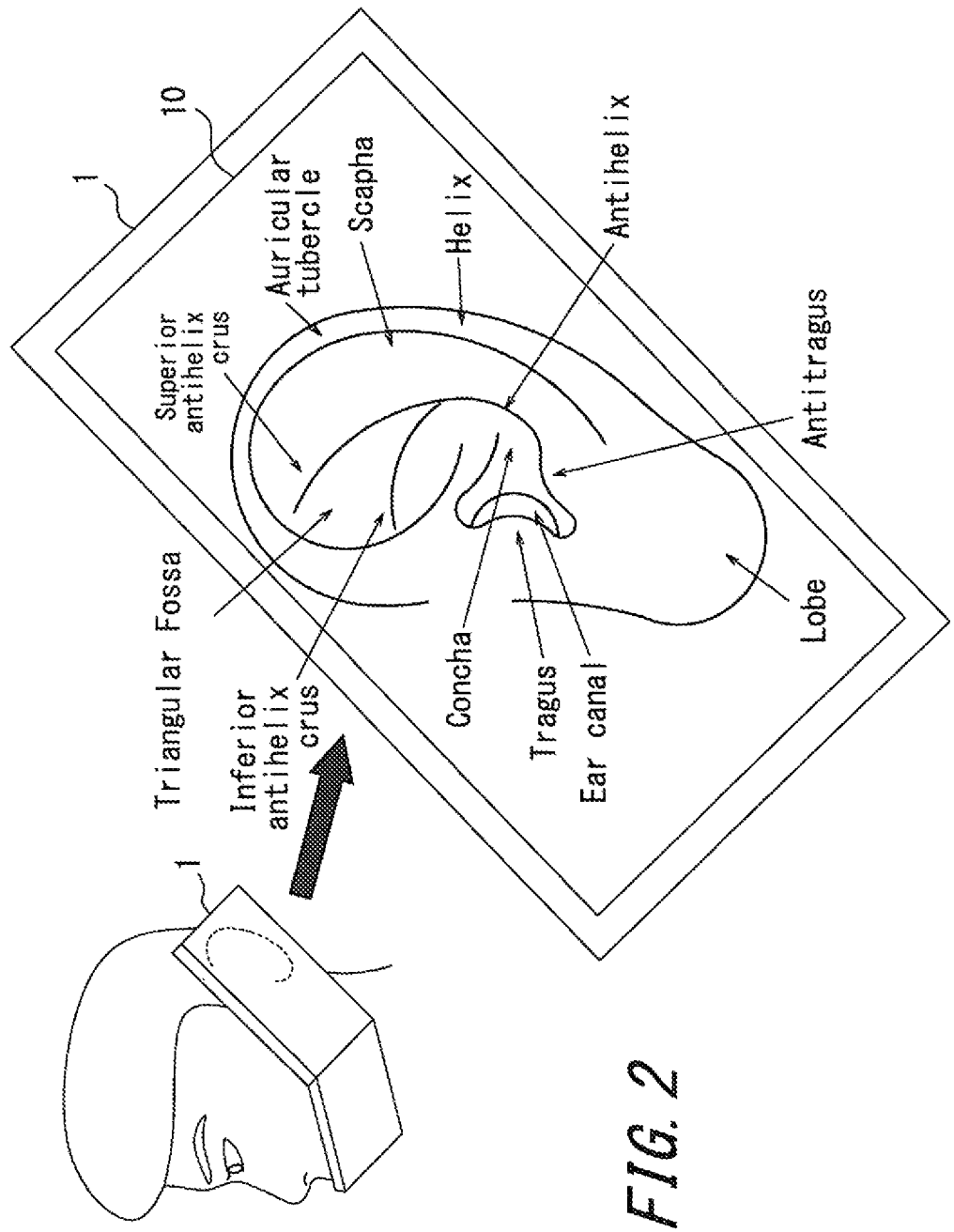
FIG. 2 is a diagram illustrating an example of a preferred shape of a panel of the electronic apparatus illustrated in FIG. 1.

Here, the panel 10 may be in size approximately similar to the user's ear. Or, as illustrated in FIG. 2, the panel 10 may be larger than the user's ear. In this case, when the user listens to the sound, the entire ear is likely to be covered by the panel 10 of the electronic apparatus 1, allowing less surrounding sounds (noises) to enter the ear canal. The panel 10 needs to vibrate in a region larger than a region having a length corresponding to a distance from the inferior antihelix crus (the lower antihelix crus) to the antitragus and a width corresponding to a distance from the tragus and the antihelix. Preferably, the panel 10 vibrates in a region having a length corresponding to a distance from an area near the superior antihelix crus (the upper antihelix crus) of the helix to the lobe and a width corresponding to a distance from the tragus to an area near the antihelix of the helix. The region having the length and the width described above may be in a rectangular shape, or in an oval shape having the above length as a long diameter and the above width as a short diameter. An average ear size of Japanese people may be obtained from Database of Japanese Body Size (1992-1994) provided by Research Institute of Human Engineering for Quality Life (HQL). When the panel 10 is in size equal to or larger than the average ear size of Japanese people, it is considered that the panel 10 may cover most of foreign nationals' entire ears. Having the sizes and the shapes described above, the panel 10 may cover the user's ear and have an allowance for misalignment thereof with respect to the ear.

The electronic apparatus 1 described above, by vibrating the panel 10, may deliver the air conduction sound and the vibration sound that is delivered via a part of the user's body (for example, the cartilage of the outer ear). Therefore, when sound at a volume similar to that of a conventional dynamic receiver is output, less sound is delivered around the electronic apparatus 1 through air vibration by the vibration of the panel 10 than that of the dynamic receiver. Accordingly, the electronic apparatus 1 is suitable for listening to, for example, a recorded message on a train or the like.

Also, the electronic apparatus 1 described above generates a sound of the vibration of the panel 10 caused by the piezoelectric element delivered via the human body. The sound delivered via the human body, through the soft tissue (for example, the cartilage), vibrates the middle ear or the inner ear. Since the electronic apparatus 1 described above delivers the vibration sound by vibrating the panel 10, when the user is wearing, for example, earphones or headphones, the user may hear the sound via the earphones or the headphones and a part of the user's body by bringing the electronic apparatus 1 into contact with the earphones or the headphones.

The electronic apparatus 1 described above delivers the sound to the user by vibrating the panel 10. Therefore, when the electronic apparatus 1 does not separately include the dynamic receiver, an opening (a sound opening) for voice transmission does not need to be formed on the housing, which allows simplification of a waterproof structure of the electronic apparatus 1. Note that, when the electronic apparatus 1 has the dynamic receiver, the sound opening is preferably sealed with a material that ventilates while blocking liquid. Such a material for ventilating while blocking liquid is, for example, Gore-Tex (registered trademark).

Figure 3A:
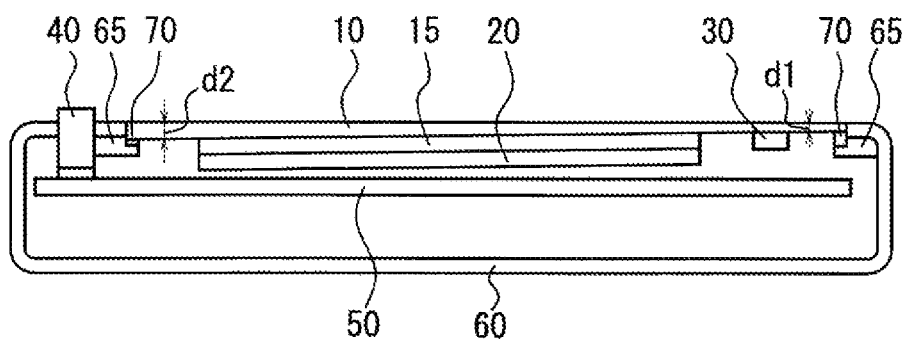
FIGS. 3A and 3B are diagrams illustrating cross-sections of the electronic apparatus illustrated in FIG. 1.
Figure 3B:
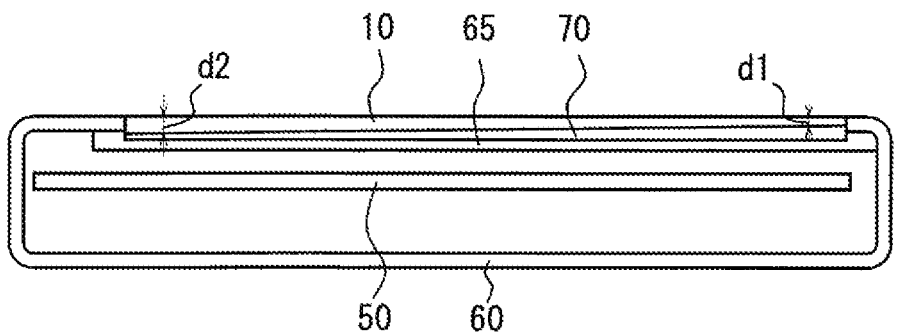

FIG. 3 are diagrams schematically illustrating cross-sections of the electronic apparatus 1 illustrated in FIG. 1. FIG. 3A is a cross-sectional view taken from line a-a of FIG. 1, and FIG. 3B is a cross-sectional view taken from line b-b of FIG. 1. The electronic apparatus 1 illustrated in FIG. 3 is the smart phone having a glass panel substantially rectangular in shape in a planar view serving as the panel 10 mounted on a front side of the housing 60 (for example, a metal or resin case).

As illustrated in FIGS. 3A and 3B, the panel 10 is made of, for example, glass or acryl and held (supported) by the panel retainer 65 formed on the housing 60. FIG. 3A illustrates a state in which the panel 10 is supported by the panel retainer 65 in a region near an upper edge (in the figure a region near a right end of the panel 10) and in a region near a lower edge (in the figure a region near a left end of the panel 10). On the other hand, FIG. 3B illustrates a state in which the panel 10 is supported by the panel retainer 65 at positions near side edges of the panel 10. As illustrated in FIGS. 3A and 3B, the panel 10 is preferably fixed to the panel retainer 65 via the joint member 70. The joint member 70 is a thermocurable adhesive, an ultraviolet curable adhesive, the double-sided adhesive tape or the like and may be an optical elasticity resin such as, for example, a colorless and transparent acrylic ultraviolet curable adhesive.

As can be seen from FIGS. 3A and 3B, the panel retainer 65, in order to support the edges of the panel 10, preferably has a frame-like shape or the like corresponding to the shape of the edges of the panel 10. The panel retainer 65 may be a member formed separately from the housing 60 and attached to the housing 60 by using the adhesive or double-sided tape, or integrally formed with the housing 60. Each of the panel 10, the touch sensor 15, the display 20, and the piezoelectric element 30 is substantially rectangular in shape.

Further, to the panel 10 except the position near the edges of the panel 10 in a planar view, the touch sensor 15 and the display 20 are attached. In this case, the touch sensor 15 and the display 20 may be attached to the rear surface of the panel 10 via joint members and the like, although the joint members for attaching these components are omitted in FIG. 3A. In FIG. 3A, the touch sensor 15 and the display 20 are fixed to the panel 10 within the housing 60. In this case, the joint members for fixing the touch sensor 15 and the display 20 to the panel 10 may be the thermocurable adhesive, the ultraviolet curable adhesive, the double-sided adhesive tape or the like, and may be the optical elasticity resin such as, for example, the colorless and transparent acrylic ultraviolet curable adhesive.

The display 20, together with the touch sensor 15, is disposed in the approximately center of the panel 10 in the short direction of the panel 10. The piezoelectric element 30 is disposed being apart from the end of the longitudinal direction of the panel 10 by the predetermined distance near the end in such a manner that the longitudinal direction of the piezoelectric element 30 faces along a short side of the panel 10. The display 20 and the piezoelectric element 30 are arranged side by side in the direction parallel to the internal surface of the panel 10. As illustrated in FIG. 3A, a fixed portion of the piezoelectric element 30 is positioned outside an overlapping region of the panel 10 and the display 20 in a planar view. The piezoelectric element 30 is substantially rectangular in shape and attached to the panel 10 in such a manner that a long side of the piezoelectric element 30 faces along the short side of the panel 10.

According to the present embodiment, also, the input unit 40 may include at least one key; as three keys are illustrated in FIG. 1, the input unit 40 may include a plurality of keys. As illustrated in FIG. 3A, the input unit 40 and the piezoelectric element 30 that is supported by and vibrates the panel 10 are disposed opposite to each other with respect to the center of the panel 10. The input unit 40, as illustrated in FIG. 3A, is retained (supported) by the housing 60 and the substrate 50. According to the present embodiment, that is, a top side of the input unit 40 is held by the housing 60, while a bottom side of the input unit 40 is supported by the substrate 50. Note that FIG. 3 omit various components disposed on the substrate 50. Also, the substrate 50 may be supported and fixed by the housing 60 or various components disposed on the housing 60. Since a variety of structures for supporting the substrate 50 inside the housing 60 may be conceived, FIG. 3 omit an element (elements) supporting the substrate 50.

According to the electronic apparatus 1 of the present embodiment, as described above, the panel 10 deforms due to the deformation of the piezoelectric element 30 attached to the rear surface of the panel 10, and thus the air conduction sound and the vibration sound are delivered to an object in contact with the panel 10 being deformed. That is, the electronic apparatus 1 according to the present embodiment includes the panel 10, the panel retainer 65 for supporting the panel 10, and the piezoelectric element 30 for vibrating the panel 10 and thereby generating the air conduction sound and the vibration sound that is delivered via the human body.

Accordingly, without the necessity to protrude the vibrator on an outer surface of the housing 60, the air conduction sound and the vibration sound may be delivered to the user, offering better usability than an electronic apparatus described in Patent Document 1 that requires bringing a vibrator, which is very small relative to the housing, into contact with the human body. According to the electronic apparatus 1, also, since there is no need to bring the piezoelectric element itself into contact with the user's ear, the piezoelectric element 30 is unlikely to be damaged. Also, when the housing 60 as opposed to the panel 10 is deformed so as to generate the vibration, the user is likely to drop the terminal. However, when the panel 10 of the electronic apparatus 1 is vibrated, such an accident is unlikely to occur.

As described above, also, the piezoelectric element 30 is preferably attached to the panel 10 by using the joint member. Thereby, the piezoelectric element 30 may be attached to the panel 10 in a state that the freedom of the deformation of the piezoelectric element 30 is unlikely to be inhibited. Also, the joint member may be the non-thermocurable adhesive, which offers an advantage that, during curing, thermal stress shrinkage is unlikely to occur between the piezoelectric element 30 and the panel 10. Or, the joint member may be the double-sided tape, which offers an advantage that shrinkage stress, such as one applied in using the adhesive, is hardly applied between the piezoelectric element 30 and the panel 10.

According to the present embodiment, further, the thickness of the panel 10 in the normal direction thereof is partially changed. That is, as illustrated in FIGS. 3A and 3B, the thickness of the panel 10 in the normal direction thereof differs between the region near the upper edge of the panel 10 (in the figure the region near the right end of the panel 10) and the region near the lower edge of the panel 10 (in the figure the region near the left end of the panel 10). In FIGS. 3A and 3B, a thickness d1 of the panel 10 in the region near a disposing position of the piezoelectric element 30 is smaller than a thickness d2 of the panel 10 in a remaining region of the panel 10.

According to the present embodiment, as described above, the panel 10 is formed in such a manner as to have a greater thickness in the normal direction of the panel 10 in the remaining region thereof than the region near the disposing position of the piezoelectric element 30. As an example of such a design, as illustrated in FIGS. 3A and 3B, the panel 10 may have the thickness in the normal direction thereof gradually increasing in proportion to a distance from the disposing position of the piezoelectric element 30. In FIGS. 3A and 3B, the thickness d1 of the panel 10 in the region near the disposing position of the piezoelectric element 30 gradually increases to the thickness d2 of the panel 10 near the lower edge of the panel 10 (in the figure the region near the left end of the panel 10).

Note that, when the panel 10 is made of acryl or the like and may have a thickness that is changed in stages, the thickness of the panel 10 in the normal direction thereof may increase in stages as opposed to the smooth increase as illustrated in FIGS. 3A and 3B.

In the example illustrated in FIG. 3, the thickness of the panel 10 in the normal direction thereof is gradually changed. Therefore, a thickness of the joint member 70 is changed between the region near the upper edge of the panel 10 (in the figure the region near the right end of the panel 10) and the region near the lower edge of the panel 10 (in the figure the region near the left end of the panel 10), thereby adjusting a height of the panel 10 in a thickness direction thereof. In this way, when the panel 10 is mounted on the housing 60, the panel 10 may have no inclination with respect to the housing 60. In this case, for example, by using the joint member 70 preliminarily formed to have different thicknesses based on regions thereof, the panel 10 may be attached to the housing 60. In this case, that is, the joint member 70 that is formed to have the thickness gradually decreasing from the right side to the left side in the figure is used. Also, in using the joint member 70 that is formed to have a substantially uniform thickness, in order to prevent the panel 10 from disengaging from the housing 60, a claw portion may be formed on the housing 60 so as to apply different pressures to the joint member 70 via the panel 10. In this case, that is, degree of the joint member 70 being compressed is different depending on the position of the joint member 70, when the panel 10 is fixed to the housing 60.

Figure 4:
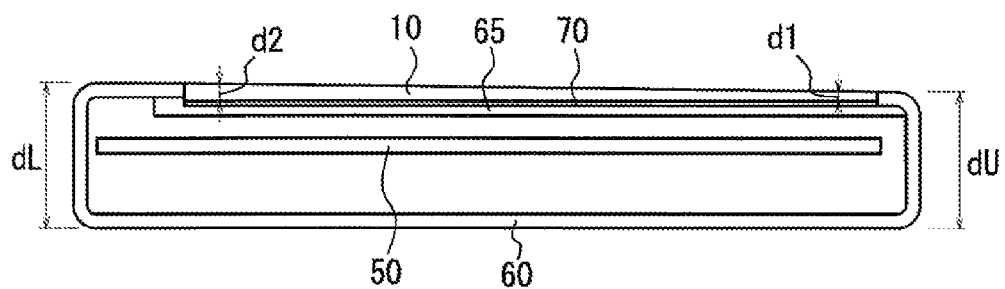
FIG. 4 is a diagram illustrating a cross-section of an exemplary variation of the electronic apparatus illustrated in FIG. 1.

As an exemplary variation of the present embodiment, in using the joint member 70 having a substantially uniform thickness as illustrated in FIG. 4, for example, the housing 60 may have different thicknesses (heights) based on regions thereof in the normal direction of the panel 10. In FIG. 4, the thickness (height) of the region of the housing 60 for supporting the panel 10 near the disposing position of the piezoelectric element 30 is represented by dU which gradually increases to dL from the disposing position of the piezoelectric element 30. In this example, when the panel 10 is mounted on the housing 60, the panel 10 slightly inclines. However, such a slight inclination of the panel 10 may not make the housing 60 in some design look awkward.

Figure 5:
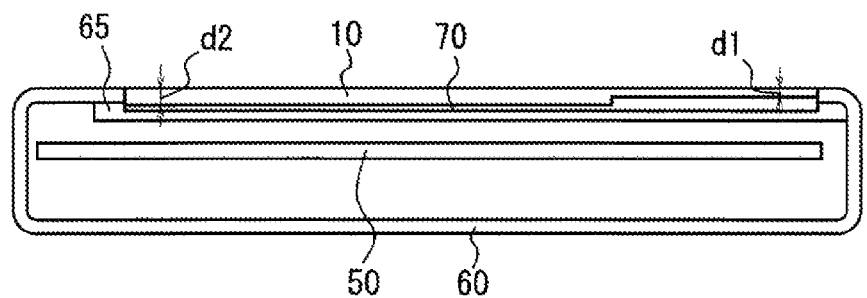
FIG. 5 is a diagram illustrating a cross-section of another exemplary variation of the electronic apparatus illustrated in FIG. 1.

As another exemplary variation of the present embodiment, further, as illustrated in FIG. 5, for example, the thickness of the panel 10 in the normal direction thereof may change at predetermined positions. In FIG. 5, the thickness of the panel 10 near the disposing position of the piezoelectric element 30 is represented by d1 which changes to d2 at a position slightly remote from the region of the panel 10 near the disposing position of the piezoelectric element 30. In this case, the thickness of the panel retainer 65 in the normal direction of the panel 10 may change at a position remote from the disposing position of the piezoelectric element 30 by a predetermined distance.

In the structure as described above, the panel 10 is relatively thick in a bottom portion of the housing sufficiently remote from the disposing position of the piezoelectric element 30, thereby reducing the vibration of the piezoelectric element 30.

In other words, the panel 10 is prevented from vibrating strongly in an excessively wide area. Therefore, the electronic apparatus 1 according to the present embodiment, when the piezoelectric element 30 vibrates the panel 10, may reduce sound leakage from the housing caused by large vibration of the bottom portion of the panel 10 that is sufficiently remote from the disposing position of the piezoelectric element 30. Also, the electronic apparatus 1 of the present embodiment, when a microphone for collecting user's voice is disposed near the input unit 40 or the like, may reduce echo caused by the sound leakage.

On the other hand, since the panel 10 is relatively thin near the disposing position of the piezoelectric element 30, the panel 10 hardly suppresses the vibration of the piezoelectric element 30 during vibration thereof. According to the electronic apparatus 1 of the present embodiment, therefore, the piezoelectric element 30 vibrates the region of the panel 10 near the disposing position thereof, thereby generating the air conduction sound and the vibration sound that is delivered via the human body in an excellent manner.

(Second Embodiment)

Figure 6A:
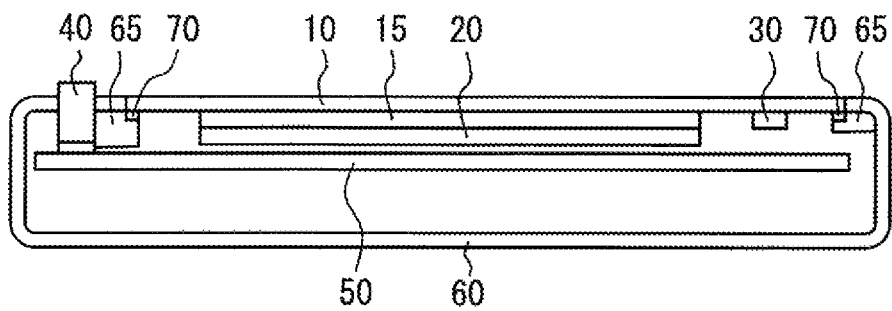
FIGS. 6A and 6B are diagrams illustrating cross-sections of an electronic apparatus according to a second embodiment.
Figure 6B:
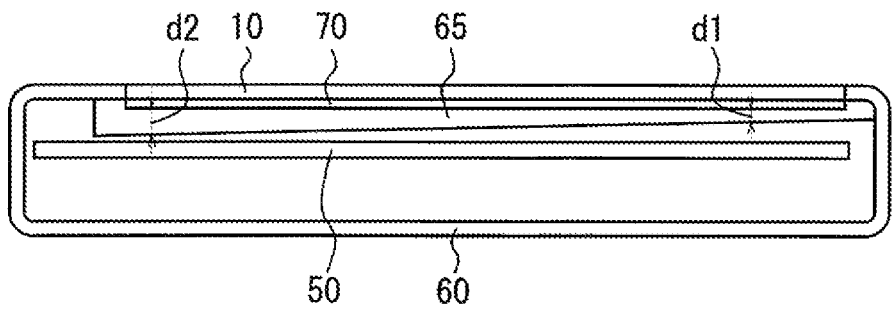

FIG. 6 are diagrams schematically illustrating cross-sections of the electronic apparatus 1 according to a second embodiment. FIG. 6A is a cross-sectional view taken from line a-a of FIG. 1. FIG. 6B is a cross-sectional view taken from line b-b of FIG. 1. The electronic apparatus 1 illustrated in FIG. 6 is the smart phone having the glass panel substantially rectangular in shape in the planar view serving as the panel 10 mounted on the front side of the housing 60 (for example, the metal or resin case). Note that descriptions of the present embodiment that are similar to those of the first embodiment will be appropriately omitted.

According to the second embodiment, the thickness of the panel retainer 65 in the normal direction of the panel 10 is partially changed. That is, as illustrated in FIG. 6B, the thickness of the panel retainer 65 in the normal direction of the panel 10 is different between the region near the upper edge thereof (in the figure the region near the right end of the panel 10) and the region near the lower edge of the panel 10 (in the figure the region near the left end of the panel 10). In FIG. 6B, a thickness d1 of a region of the panel retainer 65 for supporting the region of the panel 10 near the disposing position of the piezoelectric element 30 is smaller than a thickness d2 of a region of the panel retainer 65 for supporting the remaining region of the panel 10.

According to the present embodiment, as described above, the thickness of the panel retainer 65 for supporting the region of the panel 10 near the disposing position of the piezoelectric element 30 is smaller in the normal direction of the pane 10 than the thickness of the region of the panel retainer 65 for supporting the remaining region of the panel 10. As an example of such design, as illustrated in FIG. 6B, the panel retainer 65 may have the thickness in the normal direction of the panel 10 that increases in proportion to the distance from the region of the panel retainer 65 for supporting the region of the panel 10 near the disposing position of the piezoelectric element 30. In FIG. 6B, the thickness d1 of the region of the panel retainer 65 for supporting the region of the panel 10 near the disposing position of the piezoelectric element 30 smoothly increases toward the thickness d2 of the region of the panel retainer 65 for supporting a region of the panel 10 near the lower edge thereof (in the figure in the region near the left end of the panel 10).

Note that according to the present embodiment the thickness of the panel retainer 65 in the normal direction of the panel 10 may increase in stages as opposed to the smooth increase as illustrated in FIG. 6B.

Figure 7:
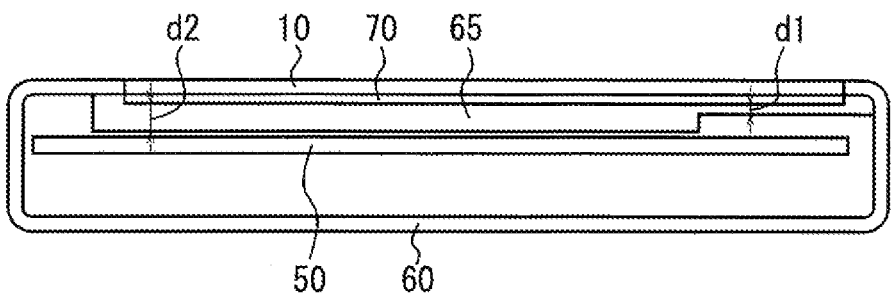
FIG. 7 is a diagram illustrating a cross-section of an electronic apparatus according to an exemplary variation of the second embodiment.

As an exemplary variation of the present embodiment, as illustrated in FIG. 7, for example, the thickness of the panel retainer 65 in the normal direction of the panel 10 may change at a predetermined position. In FIG. 4, the thickness of the region of the panel retainer 65 for supporting the region of the panel 10 near the disposing position of the piezoelectric element 30 is represented by d1 and is changed to d2 in the region of the panel retainer 65 for supporting the region of the panel 10 slightly remote from the disposing position of the piezoelectric element 30. In this way, the thickness of the panel retainer 65 may be changed at a position remote from, by the predetermined distance, the region thereof for supporting the region of the panel 10 near the disposing position of the piezoelectric element 30.

Accordingly, at the bottom portion of the housing sufficiently remote from the disposing position of the piezoelectric element 30, since the panel 10 is supported by the panel retainer 65 which is relatively thick, the panel retainer 65 may reduce the vibration of the piezoelectric element 30 during vibration thereof. In other words, the panel 10 is prevented from vibrating strongly in an excessively wide area. Therefore, the electronic apparatus 1 of the present embodiment, when the piezoelectric element 30 vibrates the panel 10, may reduce the sound leakage from the bottom portion of the housing sufficiently remote from the disposing position of the piezoelectric element 30. Also, the electronic apparatus 1 of the present embodiment, when the microphone for collecting user's voice is disposed near the input unit 40 or the like, may reduce the echo caused by the sound leakage.

On the other hand, since the region of the panel 10 near the disposing position of the piezoelectric element 30 is supported by the panel retainer 65 which is relatively thin, the panel retainer 65 suppresses, only by a small degree, the vibration of the piezoelectric element 30 during vibration thereof. According to the electronic apparatus 1 of the present embodiment, therefore, the piezoelectric element 30 vibrates the region of the panel 10 near the disposing position thereof, allowing generation of the air conduction sound and the vibration sound that is delivered via the human body in an excellent manner.

(Third Embodiment)

Figure 8A:
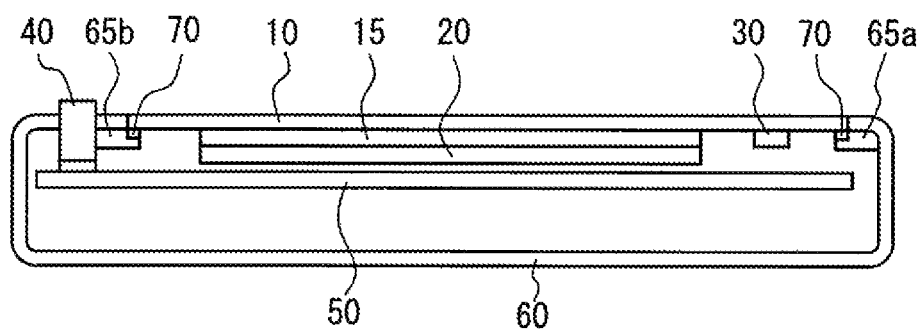
FIGS. 8A and 8B are diagrams illustrating cross-sections of an electronic apparatus according to a third embodiment.
Figure 8B:
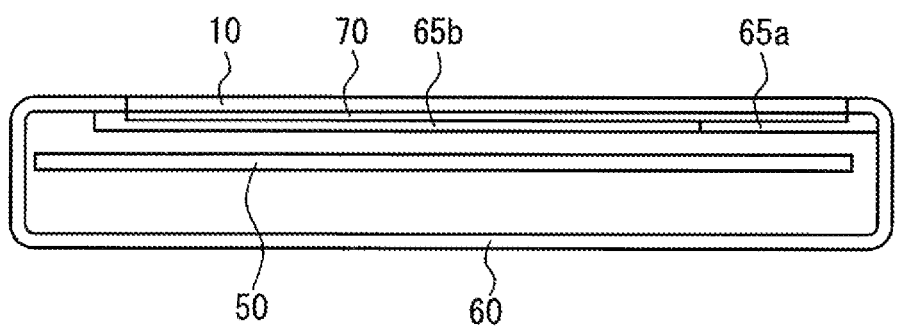

FIG. 8 are diagrams schematically illustrating cross-sections of the electronic apparatus 1 according to a third embodiment. FIG. 8A is a cross-sectional view taken from line a-a of FIG. 1. FIG. 8B is a cross-sectional view taken from line b-b of FIG. 1. The electronic apparatus 1 illustrated in FIG. 8 is the smart phone having the glass panel substantially rectangular in shape in the planar view serving as the panel 10 mounted on the front side of the housing 60 (for example, the metal or resin case). Note that descriptions of the present embodiment that are similar to those of the above embodiments will be appropriately omitted.

As illustrated in FIG. 8A, the panel 10 is made of glass or acryl, for example, and retained (supported) by panel retainers 65a and 65b formed on the housing 60. In FIG. 8A, the region of the panel 10 near the upper edge thereof (in the figure near the right end of the panel 10) is supported by the panel retainer 65a, and the region of the panel 10 near the lower edge thereof (in the figure near the left end of the panel 10) is supported by the panel retainer 65b. As illustrated in FIG. 8A, the panel 10 is preferably fixed to the panel retainers 65a and 65b via the joint member 70. The joint member may be the thermocurable adhesive, the ultraviolet curable adhesive, the double-sided adhesive tape and the like and may be the optical elasticity resin such as, for example, the colorless and transparent acrylic ultraviolet curable adhesive.

The panel retainers 65a and 65b may be formed separately from the housing 60 and attached to the housing 60 by using the adhesive or the double-sided tape, or integrally formed with the housing 60. Each of the panel 10, the touch sensor 15, the display 20, and the piezoelectric element 30 is substantially rectangular in shape.

According to the electronic apparatus 1 of the present embodiment, as described above, the panel 10 deforms due to the deformation of the piezoelectric element 30 attached to the rear surface of the panel 10, thereby delivering the air conduction sound and the vibration sound to the object in contact with the panel 10 being deformed. That is, the electronic apparatus 1 according to the present embodiment includes the panel 10, the panel retainers 65a and 65b for supporting the panel 10, and the piezoelectric element 30 that vibrates the panel 10 and thereby generates the air conduction sound and the vibration sound that is delivered via the human body.

According to the present embodiment, also, the rigidity of the panel retainers 65 for supporting the panel 10 is partially changed. According to the present embodiment, that is, as illustrated in FIG. 8B, for example, the rigidity of the panel retainer 65a and the rigidity of the panel retainer 65b are different. In this case, as compared with the rigidity of the panel retainer 65a for supporting the region of the panel 10 near the disposing position of the piezoelectric element 30, the rigidity of the panel retainer 65b for supporting the remaining region of the panel 10 is higher.

Here, various designs may be conceived to have the rigidity of the panel retainer 65a for supporting the region of the panel 10 near the disposing position of the piezoelectric element 30 is lower than the rigidity of the panel retainer 65b for supporting the remaining region of the panel 10. Preferably, the rigidity of the panel retainer 65 corresponds to flexural rigidity thereof.

For example, as compared with the glass fiber content of the material of the panel retainer 65a for supporting the region of the panel 10 near the disposing position of the piezoelectric element 30, the glass fiber content of the material of the panel retainer 65b for supporting the remaining region of the panel 10 may be higher. Having high glass fiber content in this manner allows the material of the panel retainer 65b to be hard, whereby the panel retainer 65b has higher rigidity than the panel retainer 65a.

Also, for example, the panel retainer 65a for supporting the region of the panel 10 near the disposing position of the piezoelectric element 30 may contain a material with lower rigidity than that of the material of the panel retainer 65b for supporting the remaining region of the panel 10. That is, the panel retainer 65a and the panel retainer 65b may contain different materials such that the material of the panel retainer 65b is harder and has higher rigidity than the material of the panel retainer 65a.

Further, for example, into the panel retainer 65b for supporting the remaining region of the panel 10, a plate member having higher rigidity than the panel retainer 65a for supporting the region of the panel near the disposing position of the piezoelectric element 30 may be inserted. For example, the panel retainer 65b may be formed having a metal plate with a predetermined thickness inserted therein, while no metal plate is inserted into the panel retainer 65a. Such insert molding by partially inserting the metal plate into the panel retainer allows higher rigidity of the portion having the metal plate inserted thereinto.

According to the present embodiment, as described above, as compared with the rigidity of the panel retainer 65a for supporting the region of the panel 10 near the disposing position of the piezoelectric element 30, the rigidity of the panel retainer 65b for supporting the region of the panel 10 sufficiently remote from the disposing position of the piezoelectric element 30, e.g., the region near the bottom portion of the housing is higher. Accordingly, since the panel 10 is supported by the panel retainer 65b having relatively high rigidity in the region sufficiently remote from the disposing position of the piezoelectric element 30, the vibration of the piezoelectric element 30 is reduced during vibration thereof. In other words, the panel 10 is prevented from vibrating strongly in an excessively wide area. Therefore, the electronic apparatus 1 according to the present embodiment, when the piezoelectric element 30 vibrates the panel 10, may reduce sound leakage from the housing and the like caused by the vibration of the remaining region of the panel 10. Also, the electronic apparatus 1 of the present embodiment, when the microphone for collecting user's voice is disposed near the input unit 40 or the like, may reduce the echo caused by the sound leakage.

On the other hand, since the region of the panel 10 near the disposing position of the piezoelectric element 30 is supported by the panel retainer 65a having relatively low rigidty, the vibration of the piezoelectric element 30 is unlikely to be suppressed during vibration thereof. In the electronic apparatus 1 of the present embodiment, accordingly, the piezoelectric element 30 vibrates the region of the panel 10 near the disposing position of the piezoelectric element 30, thereby generation the air conduction sound and the vibration sound that is delivered via the human body in an excellent manner.

Figure 9:
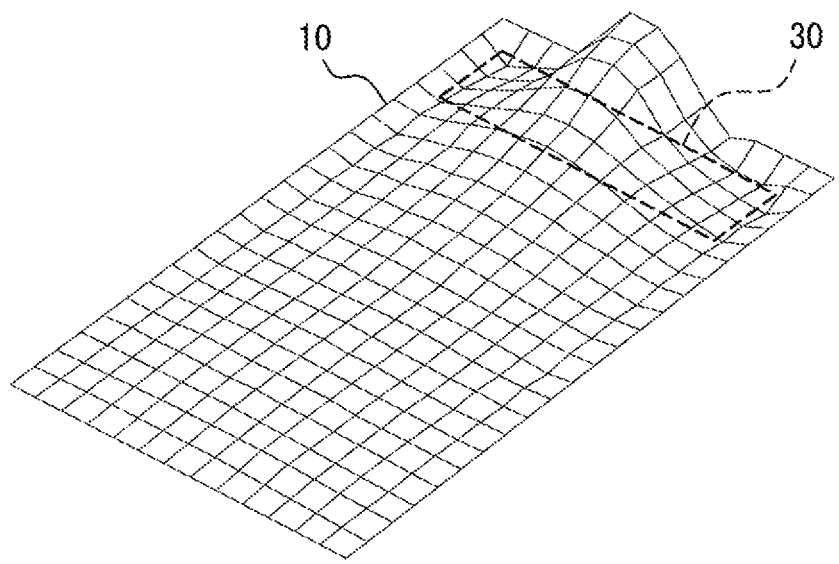
FIG. 9 is a diagram illustrating an example of vibration of the panel.

FIG. 9 is a diagram illustrating an example of the vibration of the panel 10 of the electronic apparatus 1 according to the embodiments described above. In the electronic apparatus 1 according to the above embodiments, a lower portion of the panel 10, as described above, is less likely to vibrate as compared with an upper portion of the panel 10 having the piezoelectric element 30 attached thereto. Accordingly, the lower portion of the panel 10 may reduce the sound leakage caused by the vibration thereof. The upper portion of the panel 10 is directly bent by the piezoelectric element 30, and the vibration attenuates in the lower portion of the panel 10 as compared with the upper portion. The panel 10 is bent by the piezoelectric element 30 in such a manner that the region of the panel 10 directly above the piezoelectric element 30 is raised the highest in the longitudinal direction of the piezoelectric element 30 as compared with its surrounding region.

Although the present invention has been described based on the figures and the embodiments, it is to be understood that various changes and modifications may be implemented based on the present disclosure by those who are ordinarily skilled in the art. Accordingly, such changes and modifications are included in the scope of the present invention. For example, functions and the like included in each unit, each step and the like may be rearranged without logical inconsistency, so as to combine a plurality of components or steps together or to divide them.

For example, although the above embodiments assume that the electronic apparatus 1 is the mobile phone or the smart phone, the electronic apparatus 1 according to the present invention is not limited thereto. The electronic apparatus according to the present invention may be various electronic apparatus such as a tablet PC and a special purpose terminal that include the piezoelectric element for vibrating the panel supported by the panel retainer and thereby generating the air conduction sound and the vibration sound that is delivered via the human body.

Also, in the above embodiments, for example, the display 20 does not need to be attached to the panel 10. For example, when the display 20 is fixed to a portion of the housing 60 without being fixed to the panel 10, the vibration of the entire panel 10 becomes larger than that of the entire panel 10 having the display 20 attached thereto.

Also, for example, when the panel 10 and the display 20 do not overlap with each other, the piezoelectric element 30 may be disposed in the center of the panel 10. When the piezoelectric element 30 is disposed in the center of the panel 10, the vibration of the piezoelectric element 30 is uniformly delivered to the entire panel 10, thereby improving quality of the air conduction sound and allowing the user to perceive the vibration sound by bringing various portions of the panel 10 into contact with the ear. Note that the number of the piezoelectric elements 30 is not limited to one but a plurality of piezoelectric elements 30 may be mounted.

Further, the panel 10 may partially or entirely constitute any one of a display panel, an operation panel, the cover panel, a lid panel for allowing removal of the battery. Especially when the panel 10 constitutes the display panel, the piezoelectric element 30 is disposed outside a display area for executing a display function. This offers an advantage that a display is hardly inhibited. Also, the input unit 40 includes the touch sensor 15 of the embodiments described above. Further, the input unit 40 includes a sheet key, which is a member having a key top of operation keys of, for example, a folding mobile phone integrally formed thereon and forming one plane of the housing having an operation unit.

REFERENCE SIGNS LIST

1 electronic apparatus
10 panel
15 touch sensor
20 display
30 piezoelectric element
40 input unit (key)
50 substrate
60 housing
65 panel retainer
70 joint member

The invention claimed is:

1. An electronic apparatus comprising:
   a panel;
   a panel retainer for supporting the panel; and
   an element for vibrating the panel and thereby generating a vibration sound to be delivered via a human body, wherein
   compared with a region of the panel near a disposing position of the element, a remaining region of the panel is thicker in a normal direction of the panel, and
   the panel is bent by the element in such a manner that a region of the panel directly above the element is raised the highest in a longitudinal direction of the element as compared with its surrounding region, and the panel vibrates a part of a human body in contact with the panel and delivers a sound.

2. The electronic apparatus according to claim 1, wherein a thickness of the panel in the normal direction thereof gradually increases in proportion to a distance from the region of the panel near the disposing position of the element.

3. The electronic apparatus according to claim 1, wherein a thickness of the panel in the normal direction thereof changes at a position in a predetermined distance from the region near the disposing position of the element.

4. The electronic apparatus according to claim 1, wherein the panel generates the vibration sound and an air conduction sound.

5. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer is thicker in a normal direction of the panel, and
the panel is bent by the element in such a manner that a region of the panel directly above the element is raised the highest in a longitudinal direction of the element as compared with its surrounding region, and the panel vibrates a part of a human body in contact with the panel and delivers a sound.

6. The electronic apparatus according to claim 5, wherein a thickness of the panel retainer in the normal direction of the panel gradually increases in proportion to a distance from a region of the panel retainer for supporting a region of the panel near the disposing position of the element.

7. The electronic apparatus according to claim 5, wherein a thickness of the panel retainer in the normal direction of the panel changes at a position in a predetermined distance from the region of the panel retainer for supporting the region of the panel near the disposing position of the element.

8. The electronic apparatus according to claim 5, wherein the panel generates the vibration sound and an air conduction sound.

9. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and
the rigidity of the panel retainer corresponds to flexural rigidity of the panel retainer.

10. The electronic apparatus according to claim 9, wherein the panel generates the vibration sound and an air conduction sound.

11. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and
a material of a region of the panel retainer for supporting a region of the panel near the disposing position of the element has lower glass fiber content than a material of a region of the panel retainer for supporting the remaining region of the panel.

12. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and
the region of the panel retainer for supporting the region of the panel near the disposing position of the element contains a material with lower rigidity than a material of the region of the panel retainer for supporting the remaining region of the panel.

13. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and, into the region of the panel retainer for supporting the remaining region of the panel, a plate-shaped member having higher rigidity than the region of the panel retainer for supporting the region of the panel near the disposing position of the element is inserted.

14. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and, compared with the region of the panel retainer for supporting the region of the panel near the disposing position of the element, the region of the panel retainer for supporting the remaining region of the panel is thicker in a normal direction of the panel.

15. The electronic apparatus according to claim 14, wherein a thickness of the panel retainer in the normal direction of the panel gradually increases in proportion to a distance from the region of the panel retainer for supporting the region of the panel near the disposing position of the element.

16. The electronic apparatus according to claim 15, wherein the thickness of the panel retainer in the normal direction of the panel changes at a position in a predetermined distance from the region of the panel retainer for supporting the region of the panel near the disposing position of the element.

17. An electronic apparatus comprising:
a panel;
a panel retainer for supporting the panel; and
an element for vibrating the panel and thereby generating a vibration sound to be delivered via a human body, wherein
compared with a region of the panel retainer near a disposing position of the element, a remaining region of the panel retainer has higher rigidity, and the panel is bent by the element in such a manner that a region of the panel directly above the element is raised the highest in a longitudinal direction of the element as compared with its surrounding region, and the panel vibrates a part of a human body in contact with the panel and delivers a sound.

* * * * *